United States Patent
Lee et al.

(10) Patent No.: US 8,057,718 B2
(45) Date of Patent: Nov. 15, 2011

(54) MICROPOROUS POLYETHYLENE FILM HAVING EXCELLENT PHYSICAL PROPERTIES, PRODUCTIVITY, AND QUALITY CONSISTENCY, AND METHOD OF PRODUCING SAME

(75) Inventors: Young Keun Lee, Daejeon (KR); Jang Weon Rhee, Daejeon (KR); Jung Moon Sung, Seoul (KR); Byoung Cheon Jo, Daejeon (KR); Chol Ho Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 1062 days.

(21) Appl. No.: 11/698,088

(22) Filed: Jan. 26, 2007

(65) Prior Publication Data

US 2007/0116944 A1    May 24, 2007

Related U.S. Application Data

(62) Division of application No. 11/126,279, filed on May 11, 2005, now abandoned.

(30) Foreign Application Priority Data

Apr. 6, 2005   (KR) .................. 10-2005-0028531

(51) Int. Cl.
*D01D 5/12*    (2006.01)
(52) U.S. Cl. .................................................. 264/210.1
(58) Field of Classification Search ............... 264/210.1, 264/41, 210.3
See application file for complete search history.

(56) References Cited

U.S. PATENT DOCUMENTS

| | | |
|---|---|---|
| 3,843,761 A | 10/1974 | Bierenbaum et al. |
| 4,247,498 A | 1/1981 | Castro |
| 4,335,193 A | 6/1982 | Doi et al. |
| 4,539,256 A | 9/1985 | Shipman |
| 4,588,633 A | 5/1986 | Kono et al. |
| 4,778,601 A | 10/1988 | Lopatin et al. |
| 4,873,034 A | 10/1989 | Kono et al. |
| 4,877,679 A | 10/1989 | Leatherman et al. |

(Continued)

FOREIGN PATENT DOCUMENTS

EP   1 785 451   5/2007

(Continued)

OTHER PUBLICATIONS

Encyclopedia of Polymer Science and Technology, "Antioxidants", J. Wiley & Sons, Inc., Copyright 2002, vol. 4, pp. 179-208.

*Primary Examiner* — Christina Johnson
*Assistant Examiner* — Larry Thrower
(74) *Attorney, Agent, or Firm* — Clark & Brody

(57) ABSTRACT

Disclosed herein is a microporous polyethylene film for a battery separator and a method of producing the same. The microporous polyethylene film is made from a resin composition. The resin composition comprises 100 parts by weight of a polyethylene composition including 10-50 wt % polyethylene having a weight average molecular weight of from $2\times10^5$ to less than $5\times10^5$ (component I) and 90-50 wt % diluent (component II), and 0-150 parts by weight of inorganic powder (component III). The film has a puncture strength of 0.20 N/μm or more and a gas permeability (Darcy's permeability constant) of $1\times10^{-5}$ Darcy or more. The microporous polyethylene film has excellent physical properties, thus improving the performance and stability of a battery.

15 Claims, 2 Drawing Sheets

| U.S. PATENT DOCUMENTS | | | |
|---|---|---|---|
| 5,015,521 A | 5/1991 | Fujii et al. | |
| 5,051,183 A | 9/1991 | Takita et al. | |
| 5,288,762 A | 2/1994 | Park et al. | |
| 5,411,351 A | 5/1995 | Lasch et al. | |
| 5,641,565 A | 6/1997 | Sogo | |
| 5,643,511 A | 7/1997 | Pluyter et al. | |
| 5,683,634 A | 11/1997 | Fujii et al. | |
| 5,759,678 A | 6/1998 | Fujii et al. | |
| 5,786,396 A | 7/1998 | Takita et al. | |
| 5,830,554 A | 11/1998 | Kaimai et al. | |
| 6,096,213 A | 8/2000 | Radovanovic et al. | |
| 6,127,438 A * | 10/2000 | Hasegawa et al. | 521/64 |
| 6,245,272 B1 | 6/2001 | Takita et al. | |
| 6,566,012 B1 | 5/2003 | Takita et al. | |

| FOREIGN PATENT DOCUMENTS | | |
|---|---|---|
| JP | 01-167344 | 7/1989 |
| JP | 03-245457 | 11/1991 |
| JP | 06-212006 | 8/1994 |
| JP | 06-234876 | 8/1994 |
| JP | 09-003228 | 1/1997 |
| JP | 09-259858 | 10/1997 |
| JP | 2000-017100 | 1/2000 |
| JP | 2000-204188 | 7/2000 |
| JP | 2002-338730 | 11/2002 |
| JP | 2003-82139 | 3/2003 |
| JP | 2004-182763 | 7/2004 |
| JP | 2004-196871 | 7/2004 |
| KR | 2001-0072452 | 7/2001 |

* cited by examiner

MICROPOROUS POLYETHYLENE FILM HAVING EXCELLENT PHYSICAL PROPERTIES, PRODUCTIVITY, AND QUALITY CONSISTENCY, AND METHOD OF PRODUCING SAME

CROSS-REFERENCE TO RELATED APPLICATION

This is a divisional of U.S. patent application Ser. No. 11/126,279 filed May 11, 2005 now abandoned.

BACKGROUND OF THE INVENTION

1. Field of the Invention

The present invention relates to a microporous polyethylene film and a method of producing the same. More particularly, the present invention pertains to a microporous polyethylene film and a method of producing the same, in which a resin composition suitable for a roll-type stretching in a machine direction is employed, and a two-step biaxial stretching process, where stretching is implemented in a transverse direction using a tenter after stretching is conducted in the machine direction under a condition that stretching is dispersedly conducted, is conducted, thus assuring high productivity, quality consistency, and excellent physical properties. Thereby, the film can improve the performance and stability of a battery using it.

2. Description of the Related Art

Having chemical stability and superior physical properties, a microporous polyolefin film is widely used as various battery separators, filters, and ultrafiltration membranes.

The production of the microporous film using polyolefin may be conducted according to the following three processes. In a first process, polyolefin is processed into a thin fiber to produce a nonwoven fabric-shaped microporous film. A second process is a dry process, in which a thick polyolefin film is prepared and stretched at low temperatures to create micro cracks between lamellas corresponding to crystalline portions of the polyolefin to form micro pores in the polyolefin. A third process is a wet process, in which polyolefin is compounded with a diluent (a low molecular weight organic substance having a molecular structure similar to polyolefin) at high temperatures to form a single phase, phase separation of polyolefin and diluent is initiated in a cooling step, and the diluent is extracted to form pores in polyolefin. In comparison with the first and second processes, the wet process, corresponding to the third process, produces a thin film having uniform thickness and excellent physical properties, and thus, the film produced according to the wet process is widely used for an isolation membrane of a secondary battery, such as a lithium ion battery.

A method of producing a porous film according to a wet process is disclosed in U.S. Pat. No. 4,247,498. This patent discloses a method comprising blending polyethylene and a compatible liquid compound at high temperatures to form a thermodynamically homogeneous phase solution, and cooling the solution to initiate solid/liquid or liquid/liquid phase separation of the polyethylene and the compatible liquid compound, thereby producing the porous polyolefin film. However, the method does not use a stretching process.

In conjunction with the earnest use of a secondary battery, continuous efforts have been made to improve the productivity and physical properties of a microporous film employing a wet process. A representative example uses ultra-high molecular weight polyolefin (UHMWPO) with a weight average molecular weight of about 1,000,000, or mixes such a UHMWPO with a composition so as to increase the molecular weight of the composition, or employs a stretching process so as to improve the strength of the porous film.

With respect to this, U.S. Pat. Nos. 5,051,183, 5,830,554, 6,245,272, and 6,566,012 disclose a method of producing a microporous film, in which a sheet is produced using a composition mixed with polyolefin having a weight average molecular weight of 500,000 or more and a solvent capable of dissolving polyolefin at high temperatures, and the sheet is sequentially subjected to a stretching process and a solvent extraction process. These patents adopt uniaxial stretching or biaxial stretching in the stretching process, and a typical tenter, roll, calendar method, or combination thereof is employed. With respect to the biaxial stretching, the patents give an extensive description, which comprises both simultaneous biaxial stretching and two-step biaxial stretching. However, all of the examples in the patents are limited to simultaneous biaxial stretching, or give explanations only of the biaxial stretching, but do not mention stretching temperatures in machine and transverse directions. In other words, the patents do not disclose a characteristic of the two-step biaxial stretching in which the stretching is conducted in the transverse direction using a tenter after the stretching is conducted in the machine direction using a roll, a characteristic of simultaneous biaxial stretching, or a difference between the two characteristics.

Of commercial microporous polyolefin films, goods which are considered to have excellent physical properties and are created through the wet process are classified into goods produced by conducting stretching after a diluent has been extracted and other goods produced by conducting stretching before a diluent is extracted. In the latter, the stretching is easily achieved because of the softness of the polyolefin, imparted by the diluent. Furthermore, since the film is made thin by stretching, the diluent can be easily removed from the film. However, it is extensively known that, up to now, the production of commercial goods by stretching before extracting the diluent has been accomplished only using the simultaneous biaxial stretching method.

Simultaneous biaxial stretching is a stretching method in which a sheet made from a composition of polyolefin and diluent is fixed using chucks (clamping means) for seizing both ends of the sheet in a form resembling thumbs and index fingers of both hands coming into contact with lower and upper surfaces of the sheet, respectively, and the chucks are simultaneously pulled outward in transverse and machine directions. In this method, since there is holding power when the chucks seize the sheet, slippage does not occur during the stretching, and there are no defects on the surface of a middle portion of the sheet in practice because the stretching is conducted only while both ends of the sheet are seized. Accordingly, the film produced using this method can be used for optical applications.

A portion of the chuck, which seizes the sheet, has the shape of a circle or oval having a diameter of 10-30 mm. The distance in the machine direction between the centers of the chucks is designed so as to be 20-60 mm. If the sheet is stretched in the machine direction by a stretching ratio of 6 times, the distance in the machine direction between the centers of the chucks is 120-360 mm, thus they are spaced apart from each other at an interval from 90 to 350 mm. For example, if circular chucks having a diameter of 10 mm are employed and the distance between the centers of the chucks is designed to be 15 mm so that the stretching is conducted at a stretching ratio of 6 times, since the distance between the centers of the chucks is 90 mm after the stretching, a holding index is just 10/90 (about 11%) based on the machine direction length. Therefore, if the thin film is inspected after stretching, the holding area seized by the chucks is observed to be significantly reduced. However, since there are no chucks on a portion which is not held, no holding power is applied thereto, so it shrinks even though stretching is conducted. Accordingly, there occurs a major disadvantage in that stretching ratios in the transverse direction are different from each other between the portions which are seized and not seized by the chucks. If another stretching ratio is calculated using the same chuck diameter and the same distance between the centers of the chucks as the above example, since the holding index is 10/45 (about 22%) when the stretching is conducted at the stretching ratio of 3 times, and 10/150 (about 7%) when the stretching is conducted at the stretching ratio of 10 times, most portions of the sheet are not held by the chucks after stretching, thus most portions of the sheet shrink in the transverse direction (see FIG. 1).

In addition, since the width of the portion that is not seized by the chuck is narrower than that of the portion that is seized by the chuck, larger portions, on which marks remain due to the chucks and which must be removed in all the stretching processes using the chucks, are cut. This reduces yield during the stretching process. FIG. 1 illustrates the shape of a sheet after it is simultaneously biaxially stretched. Since both edges on which the chuck marks remain must be cut, the effective width of the practically produced sheet corresponds to W. Since the minimum width (L) of the portion of the sheet that shrinks because it is not seized by the chuck is smaller than the distance (H) between the chucks, the effective width (W) of the sheet is reduced, resulting in reduced yield.

Moreover, the chunk used for simultaneous stretching must be designed to endure two-directional stresses simultaneously applied in machine and transverse directions during the stretching, thus it has a complicated structure and a stretching device is costly in comparison with a chuck used to conduct unidirectional stretching. Furthermore, it is disadvantageous in that it provides reduced stretching speed, inconsistent quality, and poor yield due to structural problems with the stretching device.

With respect to physical properties of goods, the most significant disadvantage of the commercial simultaneous biaxial stretching device is that, since the stretching ratio is fixed during a designing stage because of the complicated structure and cost, it is impossible to produce goods requiring the stretching ratio to be changed. For example, when using the simultaneous biaxial stretching device in which stretching ratios are set to 6 times in both machine and transverse directions, it is impossible to conduct stretching so that the stretching ratio is changed to be 5 or 7 times. This means that it is difficult to produce goods having various physical properties in order to meet various needs of consumers.

However, when using a two-step biaxial stretching device, since it is easy to produce goods requiring stretching ratios to be changed in machine and transverse directions, it is possible to produce goods having various physical properties. Additionally, if a microporous polyolefin film is produced using the two-step biaxial stretching device, desirably, it is possible to significantly improve productivity, reduce an installation cost, and reduce defective fractions when working.

Hence, in the production of the microporous polyolefin film using the wet process, if two-step biaxial stretching is employed as the stretching method before the diluent is extracted, the disadvantages of the simultaneous biaxial stretching method can be basically avoided.

In practice, in the two-step biaxial stretching method, it is unnecessary to use the chuck when the stretching is conducted in the machine direction, and the sheet is completely stretched using only a roll, thus there is no problem with respect to the holding. Furthermore, as for the chuck used to conduct the stretching in the transverse direction using a tenter, since the sheet is stretched in the transverse direction using a rectangular chuck, intervals between the chucks are not changed in the machine direction after the stretching is conducted, thus the holding index can be maintained constant before and after the stretching is conducted.

The length of the chuck capable of being used to conduct stretching in the transverse direction is designed to be from 1 to 10 inches. In the chuck designed so as to have a length of 2 inches, the total length of the chuck is 40.8 mm and the interval between the adjacent chucks is 10 mm, thus the holding index is about 80.3% (40.8/50.8×100). In practice, if the holding index is 70% or more after the stretching is conducted, there is no problem with respect to shrinkage of the portion that is not held, thus it is possible to maintain a predetermined stretching ratio through the entire sheet and to minimize the chuck mark area of both edges of the sheet, which is to be removed. Accordingly, it is possible to increase the yield of the stretching process.

Moreover, in the roll and the chuck used in the two-step biaxial stretching, since it is enough to design them so as to endure only one of the stresses occurring in the machine and transverse directions, they have a simple structure and increased holding power in comparison with the chuck used in simultaneous biaxial stretching, thus they are competitive in terms of stability, mechanical operation speed, and installation cost With respect to the performance of goods, the most important advantage of the commercial two-step biaxial stretching device is that it is possible to produce goods having various physical properties by variously changing the machine direction stretching ratio to be a few times as high as the original stretching ratio, which depends on the number of rolls and constitution of the motor, and that, in the tenter for stretching in the transverse direction, since the stretching ratio can be freely changed depending on the width ranges of an inlet and an outlet, it is possible to produce goods having various physical properties even though only one device is employed.

However, even though the two-step biaxial stretching method is extensively used to produce a thin film, up to now, it has not been applied to the stretching process before extraction in a microporous polyolefin film wet process field. Many reasons may be given for this. Of them, the primary reason is that a slippery sheet which is mixed with an excess amount of organic liquid composition (solvent, plasticizer or the like) must be stretched in the machine direction using a roll. That is to say, in a sheet mixed with an excess amount of an organic liquid compound like oil, since the liquid substance is present on the surface of the sheet, it is difficult to precisely conduct stretching in the machine direction using the roll and a typical stretching method because the sheet slips from the roll. Additionally, since it inevitably comes into contact with the roll during the stretching, the physical properties of the microporous film are deteriorated due to damage to the surface of the sheet caused by frictional force. Particularly, if the sheet is stretched while being pressed using a pinching roll so as to prevent the sheet from slipping, undesirably, the sheet is forcibly made thin and the pore structure of the sheet is deformed and destroyed.

U.S. Pat. No. 5,641,565 discloses a technology of producing a porous polyolefin film, in which an organic liquid compound and an inorganic filler are added to polyolefin to produce a sheet, the organic liquid compound and the inorganic filler are removed from the sheet, and the resulting sheet is stretched. U.S. Pat. No. 5,759,678 discloses that, after a plasticizer is mixed with polyethylene to produce a sheet, the plasticizer is extracted from the sheet, and the resulting sheet is subjected to a simultaneous stretching process or a two-step stretching process to improve strength. Two patents disclose an example with respect to machine direction stretching a using a roll. It is noteworthy that, after the liquid compound or the plasticizer is extracted from the sheet, the resulting sheet is stretched using the roll without slipping. However, since the hard sheet from which the compatible organic liquid compound is removed must be stretched, the stretching ratio of the sheet is reduced, thus breakage easily occurs, the stretching ratio is limited, and defective fractions increase due to small pores. Furthermore, since the sheet which is subjected to an extraction process before the stretching is conducted is thick, a disadvantage, such as reduced extraction efficiency, occurs, as in the production of a microporous polyolefin film through a dry process.

Therefore, the present inventors have conducted extensive studies in order to avoid the problems occurring in the prior art, resulting in the finding that it is possible to produce a microporous polyethylene film having excellent physical properties and productivity, and consistent quality by two-step biaxially stretching a sheet, which contains an organic liquid compound and which is difficult to be processed through a conventional two-step biaxial stretching technology, in such a way that a resin composition suitable for machine direction stretching using a roll is employed, and conditions for the machine direction stretching are controlled.

SUMMARY OF THE INVENTION

An object of the present invention is to avoid the problems occurring in a simultaneous biaxial stretching technology, of a conventional wet process and in a two-step biaxial stretching technology after extraction of diluent, and to provide a microporous polyethylene film for batteries, which has excellent productivity and consistent quality, can produce goods having various physical properties, has excellent physical properties, and ensures the stability of a battery.

Another object of the present invention is to provide a method of producing the microporous polyethylene film.

In order to accomplish the above objects, the present invention provides a microporous polyethylene film made from a resin composition. The resin composition comprises 100 parts by weight of a polyethylene composition including 10-50% polyethylene having a weight average molecular weight of from $2 \times 10^5$ to less than $5 \times 10^5$ (component I) and 90-50% diluent (component II), and 0-150 parts by weight of inorganic powder (component III). The film has a puncture strength of 0.20 N/μm or more and a gas permeability (Darcy's permeability constant) of $1 \times 10^{-5}$ Darcy or more.

Furthermore, the present invention provides a method of producing a microporous polyethylene film. The method comprises (a) melt-extruding a resin composition to form a sheet, the resin composition comprising 100 parts by weight of a polyethylene composition that includes 10-50 wt % polyethylene having a weight average molecular weight of from $2 \times 10^5$ to less than $5 \times 10^5$ (component I) and 90-50 wt % diluent (component II), and 0-150 parts by weight of inorganic powder (component III); (b) stretching the sheet at a temperature range, where 30-80 wt % of a crystalline portion of polyethylene is melted, according to a roll-type stretching manner in a machine direction, and the machine directionally-stretched sheet at a temperature range, where 30-80 wt % of the crystalline portion of polyethylene is melted, according to a tenter-type stretching manner in a transverse direction, thereby producing a film; and (c) extracting the diluent from the film, and heat-setting the resulting film, wherein, stretching part of a roll stretching machine used in the roll-type stretching has at least 3 stretching rolls, speed of each of stretching rolls is 1.02 times~a predetermined value times faster than speed of the immediately preceding roll, and the predetermined value is gained by multiplying a total machine direction stretching ratio by 0.9.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
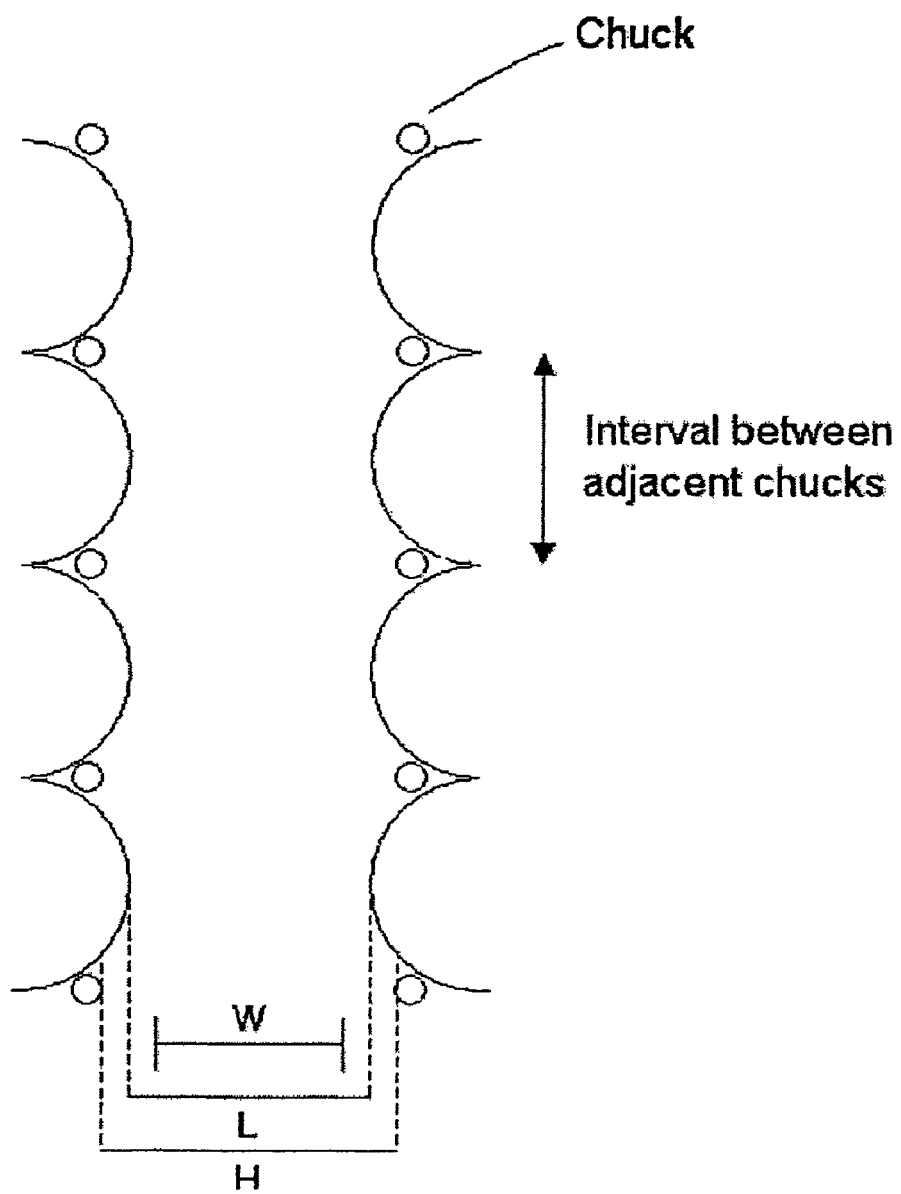
FIG. 1 illustrates a sheet which is simultaneously biaxially stretched according to a conventional technology.

Hereinafter, a detailed description will be given of the present invention.

The production of the microporous polyethylene film from polyethylene is based on the following mechanism.

A diluent forms a thermodynamically single phase in conjunction with polyethylene at high temperatures at which polyethylene is melted. When a solution of polyethylene and the diluent in the thermodynamically single phase state is cooled to room temperature, phase separation of polyethylene and the diluent starts. The single phase is divided into a polyethylene rich phase consisting mostly of a lamella corresponding to a crystalline portion of polyethylene, and a diluent rich phase containing the diluent and, partly, polyethylene which is dissolved in the diluent at room temperature. Thereafter, a sheet is stretched, the diluent is extracted with an organic solvent, and the resulting sheet is set by heating to produce the porous polyethylene film.

The basic structure of the microporous film depends on the phase separation. In other words, the pore size and structure of the final microporous film depend on the size and structure of the diluent rich phase formed through the phase separation. However, the final physical properties of the microporous film are determined in the course of again heating the cooled solid having the basic structure and subsequently stretching it. That is to say, the sizes and shapes of the fine pores depend on the stretching ratio, stretching temperature, and stretching speed. Consequently, gas and liquid permeabilities as intrinsic physical properties of the microporous film depend on stretching conditions. In addition to them, mechanical properties, shrinkage, thickness and the like depend significantly on the stretching conditions, thus the stretching process can be considered the most important process in the production of microporous polyolefin film.

Accordingly, the present inventors have studied the disadvantages of the stretching process in a conventional process of producing a microporous polyolefin film so as to overcome the disadvantages.

In the present invention, a resin composition suitable for machine direction stretching using a roll is employed and conditions of machine direction stretching are controlled so as to overcome difficulties in stretching a composition sheet of polyolefin and the diluent in a conventional two-step biaxial method before an extraction process is conducted.

Produced using a resin composition which comprises 100 parts by weight of a polyethylene composition including 10-50 wt % polyethylene having a weight average molecular weight of from $2\times10^5$ to less than $5\times10^5$ (component I) and 90-50 wt % diluent (component II), and 0-150 parts by weight of inorganic powder (component III), the microporous polyethylene film according to the present invention has a puncture strength of 0.20 N/μm or more and a gas permeability (Darcy's permeability constant) of $1\times10^{-5}$ Darcy or more.

The weight average molecular weight of polyethylene is from $2\times10^5$ to less than $5\times10^5$, and preferably, $3\times10^5$-$4\times10^5$. When the weight average molecular weight is less than $2\times10^5$, it is impossible to produce a microporous film having excellent physical properties. The load on an extruder increases due to an increase in viscosity during extrusion and extrusion compoundability is reduced due to a significant difference in the viscosity of the polyethylene and the diluent as the weight average molecular weight increases over $5\times10^5$.

As long as it forms a single phase in conjunction with polyethylene resin at an extrusion-molding temperature, any organic liquid compound may be used as the diluent. Examples of the diluent include aliphatic or cyclic hydrocarbon, such as nonane, decane, decalin, paraffin oil, and paraffin wax; phthalic acid ester, such as dibutyl phthalate, dihexyl phthalate, and dioctyl phthalate; fatty acid having 10-20 carbons, such as palmitic acid, stearic acid, oleic acid, linoleic acid, and linolenic acid; fatty alcohol having 10-20 carbons, such as palmitic alcohol, stearic alcohol, and oleic alcohol; and a mixture thereof. Of them, paraffin oil, which is harmless to humans, has a high boiling point, and contains a small volume of volatile components, is preferable, and paraffin oil having a kinetic viscosity of 20-200 cSt at 40° C. is more preferable. When the kinetic viscosity of paraffin oil is more than 200 cSt, there may occur problems, such as increased load and an inferior surface of the sheet, because of the high kinetic viscosity in the extruding process, and since it is difficult to conduct the extraction process, the productivity is reduced and the gas permeability is reduced due to the remaining diluent. On the other hand, when the kinetic viscosity of paraffin oil is less than 20 cSt, it is difficult to conduct compounding paraffin oil with polyethylene melt in the extruder during the extrusion-molding process because of a viscosity difference between paraffin oil and polyethylene melt.

The composition of polyethylene and the diluent includes 10-50 wt % polyethylene and 90-50 wt % diluent, and preferably, 20-40 wt % polyethylene and 80-60 wt % diluent. When the polyethylene content is more than 50 wt %, the porosity and pore size are reduced, and interconnection between pores is reduced, thereby greatly reducing the gas permeability. Furthermore, since the sheet is not soft during the machine direction stretching using the roll, adhesion strength to the roll is reduced, thus the stretching is conducted with difficulty, and slippage occurs. When the content of polyethylene is less than 10 wt %, the compoundability of the polyethylene and diluent is reduced, and thus, the composition is extruded in a gel state, bringing about problems, such as breakage and nonuniform thickness during the stretching process. As well, since the sheet is very soft, it is deformed by even weak frictional force, its surface is damaged during the machine direction stretching using the roll, and it is made thinner than dictated by a predetermined stretching ratio.

The inorganic powder acts as a nucleus of a pore, which functions to initiate pore formation during stretching. The inorganic powder may be selectively used to increase the porosity and pore size of the microporous film so as to increase the gas permeability, and to increase frictional force during the machine direction stretching using the roll so as to prevent slippage. Examples of the powder include calcium carbonate, silica, barium sulfate, talc, and a mixture thereof. For consistent quality, it is preferable to use calcium carbonate or silica.

The content of the inorganic powder is 0-150 parts by weight, preferably 10-100 parts by weight, and more preferably 20-80 parts by weight, based on 100 parts by weight of the composition of polyethylene and diluent. When the inorganic powder content is more than 150 parts by weight, elongation of the sheet is significantly reduced, thus causing breakage during the stretching, resulting in processing difficulty. Furthermore, since it is difficult to disperse the inorganic powder in the extruder, gels are formed, thus creating pores and causing breakage during stretching.

Additives, such as an oxidation stabilizer, a UV stabilizer, and an antistatic agent, may be further added to the resin composition so as to improve specific functions of the composition, if necessary.

The resin composition, which includes polyethylene, diluent, and, optionally, the inorganic powder, is compounded using a twin screw compounder, a kneader, or a Banbury mixer and is melt-extruded to be shaped into a sheet. After polyethylene, the diluent, and the inorganic powder (optional component) are blended with each other, they may be fed into the compounder, or may be fed through feeders separated from each other. An extrusion temperature is 160-250° C, preferably 180-230° C., and more preferably 190-220° C. When the extrusion temperature is lower than 160° C., polyethylene is insufficiently melted during the extrusion, thus a process load is high and a dispersion problem occurs. When the extrusion temperature is higher than 250° C., the molecular weight of polyethylene is reduced and a problem with respect to discoloration occurs due to thermal oxidation.

A casting or calendaring process may be applied to produce the sheet using a melt. The sheet extruded at 160-250° C. is cooled to room temperature so as to have predetermined thickness and width.

The sheet thus produced is stretched in a stretching part of a stretching machine which includes a preheating part, the stretching part, and a cooling and heat setting part, and a plurality of rolls in a machine direction at a stretching ratio of 3 times-10 times, and preferably at a stretching ratio of 4 times-8 times. When a machine direction stretching ratio is less than 3 times, orientation is poor in the machine direction, thus mechanical properties and gas permeability are reduced. When the stretching ratio is more than 10 times, there is a high possibility that breakage will occur during the stretching, and shrinkage of the final film is undesirably increased. The preheating part, and the cooling and heat setting part each include one or more rolls, and one or more pinch rolls (rolls which press upper or lower sides of the sheet toward the basic rolls at a predetermined pressure and are paired with the basic rolls so as to hold the upper or lower sides of the sheet) may be provided to the preheating part and/or the cooling and heat setting part. The pinch rolls must be pressed when the sheet is sufficiently cooled to room temperature so as to prevent the surface of the sheet from being damaged and maintain the thickness of the sheet.

The stretching part includes at least 3 rolls, and enables the stretching to be conducted in such a way that the final machine direction stretching ratio is divided among the rolls. The stretching must be uniformly conducted with respect to all of the rolls of the stretching part so as to minimize slippage of the sheet during stretching and to prevent damage to the surface of the sheet and abnormal reduction of the thickness of the sheet. If the number of rolls of the stretching part in which the stretching is conducted is less than 3, it is impossible to conduct the stretching so that the stretching ratio is divided, thus the sheet slips from the stretching roll during the stretching. Thus, it is impossible to conduct the stretching at a desired ratio. It is required to provide the stretching rolls as much as possible within the stretching part where the stretching is conducted within allowable ranges of space and cost. It is desirable to use preferably 4-20 rolls, and more preferably 5-20 rolls.

Speed of each of stretching rolls in the stretching part is 1.02 times—a predetermined value times faster than speed of the immediately preceding roll, so as to disperse the stretching. The predetermined value is obtained by multiplying the total machine direction stretching ratio by 0.9. For example, if the speed of the first stretching roll is 1.2 m/min, and the total machine direction stretching ratio is 6 times, the speed of the second stretching roll must be 1.224 m/min (1.2 m/min× 1.02)–6.48 m/min (1.2 m/min×5.4), which means 1.02 times–5.4 (6×0.9) times faster than the speed of the first stretching roll. Within the range, the sheet slips at the corresponding roll do not occur, thus the stretching is uniformly achieved in the machine direction. Furthermore, significant reduction of width of the sheet is prevented during the stretching, thus it is possible to produce goods having a desired width. The speed of the first stretching roll of the stretching part is increased based on the speed of the last roll of the preheating part.

The surface roughness of the roll of the stretching part is 0.2-10 s, preferably 0.3-6 s, and more preferably 0.4-4 s. If using a roll having a smooth surface which has roughness less than 0.2 s, the sheet slips from the roll during stretching, and, if using a roll having a rough surface which has roughness more than 10 s, the surface structure of the sheet is damaged during stretching.

The pinch roll must not be used as the rolls in the stretching part. If the sheet is stretched in the machine direction while slippage of the sheet is prevented using the pinch roll, the pinch roll presses the sheet at a predetermined pressure, thus the sheet is abnormally made thin, and surface and internal pore structures are deformed, resulting in deteriorated physical properties of a microporous film. Accordingly, use of the pinch roll must be avoided in the stretching part when stretching in the machine direction using the roll.

After being uniaxially stretched in the machine direction according to a roll-type stretching manner, the sheet is stretched in a transverse direction.

The stretching in the transverse direction is conducted in a tenter-type stretching manner so that the stretching ratio is 2 times-10 times, preferably 3 times-9 times, and more preferably 4 times-8 times. If the transverse direction stretching ratio is less than 2 times, orientation is poor in the transverse direction, thus reducing mechanical properties and gas permeability. If the stretching ratio is more than 10 times, there is a high possibility that breakage will occur during stretching, thus undesirably increasing shrinkage of the final film.

Stretching temperatures in the machine and transverse directions depend on shaping conditions in the preceding process, such as a melting temperature of polyethylene, a concentration and type of diluent, and cooling conditions of the sheet. The stretching temperatures in the machine and transverse directions are selected from a temperature range where 30-80 wt %, and preferably 40-70 wt %, of the crystalline portion of polyethylene in the sheet is melted before stretching. When the stretching temperatures are lower than a temperature where 30 wt % of the crystalline portion of polyethylene in the sheet is melted, softness of the sheet is poor, and thus, there is a fair possibility of breakage during stretching, and unstretching occurs simultaneously. Furthermore, the sheet is not stretched during the stretching process in the machine direction using the roll, and slips from the roll. When the stretching temperatures are higher than a temperature where 80 wt % of the crystalline portion of polyethylene is melted, the stretching is easily conducted and the occurrence of unstretching is reduced, but thickness variation occurs due to partial over-stretching and the physical properties of the sheet are significantly reduced because an orientation effect of the resin is insignificant. Additionally, the sheet is easily deformed during the stretching process in the machine direction using the roll, resulting in damage to the surface thereof. The melting of the crystalline portion according to the temperature may be evaluated by a differential scanning calorimeter (DSC) analysis for the film.

Unlike a simultaneous biaxial stretching process, chucks positioned at narrow intervals hold both edges of the film right before releasing the film after stretching, thus there are no portions of the film that shrink and thus make the width of the film nonuniform if a two-step biaxial stretching process, where the machine direction stretching is conducted using the roll under the above-mentioned conditions and then the transverse direction is conducted using the tenter, is conducted. Accordingly, the transverse direction stretching ratio is uniform, and it is possible to minimize an area that corresponds to both edges of the film, has chuck marks remaining thereon, and is to be removed, because the width of the film is uniform after the stretching. As well, it is impossible to change the stretching ratio in a commercial simultaneous biaxial stretching machine, but it is possible to change the stretching ratio in a two-step biaxial stretching machine, thus it is possible to produce goods having various physical properties using only one machine.

The stretched film is extracted with an organic solvent and dried. Non-limiting, illustrative examples of the available organic solvent of the present invention include any solvent capable of extracting the diluent used to extrude polyethylene resin, and preferably, methyl ethyl ketone, methylene chloride, and hexane, which have a high extraction efficiency and dry rapidly.

The extraction may be conducted according to a typical solvent extraction process, in detail, any one process or a combination of immersion, solvent spray, and ultrasonic processes. It is preferable that the amount of remaining diluent be 1 wt % or less during the extraction.

Finally, the dried film is subjected to a heat setting process so as to remove remaining stress to reduce the shrinkage of the final film. The heat setting process is conducted in such a way that the film is heated while being clamped to prevent shrinkage of the film, thereby removing the remaining stress. It is desirable that a heat-setting temperature is high in order to reduce shrinkage, but when the heat-setting temperature is very high, a portion of the film is melted and blocks micropores, thereby reducing the gas permeability. The heat-setting temperature is selected from a temperature range where 10-30 wt %, and preferably 15-25 wt %, of the crystalline portion of polyethylene in the film is melted. It is preferable that a heat-setting time be 1-20 min.

The microporous polyethylene film produced according to the present invention has the following physical properties.

(1) The puncture strength is 0.20 N/μm or more.

When the microporous film is applied to the battery separator, if the microporous film has insufficient puncture strength, defined as the strength of the film to a sharp object, the film may be torn due to an abnormal surface state of electrodes or dendrites formed on surfaces of the electrodes during use of the battery, and thus, a short may occur. When a break point is 320 g or less, a commercial battery separator is problematic in that safety is reduced due to occurrence of the short. If the film having the puncture strength of 0.20 N/μm or more according to the present invention is used as the thinnest film having is 16 μm among films for the commercial separator, a break point is higher than 320 g, thus assuring safety in use.

(2) The gas permeability (Darcy's permeability constant) is $1 \times 10^{-5}$ Darcy or more.

When the gas permeability is less than $1 \times 10^{-5}$ Darcy, efficiency of the microporous film is significantly reduced. Particularly, when the gas permeability is less than $1 \times 10^{-5}$ Darcy, in the case in which the microporous film is applied to the battery separator, charging and discharging characteristics of the battery are poor and the life of the battery is reduced. The film having the gas permeability of $1 \times 10^{-5}$ Darcy or more according to the present invention gives the battery excellent charging and discharging characteristics and low temperature characteristics, and serves to improve the life of the battery.

In addition to the above physical properties, the microporous polyethylene film of the present invention has excellent extrusion-compoundability, and provides excellent battery stability.

Having generally described this invention, further understanding can be obtained by reference to certain specific examples and comparative examples which are provided herein for the purpose of illustration only and are not intended to be limiting unless otherwise specified.

EXAMPLE

The weight average molecular weight of the polyethylene was measured using a high temperature gel permeation chromatograph (GPC) manufactured by Polymer Lab. Inc.

The viscosity of the diluent was measured using CAV-4 automatic viscometer manufactured by Cannon Co.

A composition of polyethylene, a diluent, and inorganic powder (optional component) was shaped into a sheet using a twin screw extruder in which Φ was 30 mm and L/D was 40:1. The composition was fed through a hopper after components of the composition were previously blended to form a slurry, an extrusion temperature was 210° C., and screws revolved at 200 rpm.

In order to evaluate the extrusion-compoundability, the extrudate extruded using a T-shaped die was shaped into a sheet having a thickness of 100 μm using a casting roll, and the number of gels in an area of 100 cm² was counted. The number of gels per 100 cm² was counted when the extrusion amount per time, corresponding to the standard capacity of the extruder, was 10 kg/hr, and the results are described in Tables 1 to 5. The number of gels had to be 50 or less per 100 cm² to prevent the quality of microporous film from being reduced.

Meanwhile, the resulting composition was extruded using the above T-shaped die at an extrusion rate of 10 kg/hr into a sheet having a thickness of about 900 μm, to be stretched.

The shaped sheet was analyzed using a DSC to evaluate the melting of a crystalline portion thereof according to temperature. Analysis conditions included a sample weight of 5 mg and a scanning rate of 10° C./min.

The sheet was stretched using a two-step stretching pilot device and a continuous process, similar to commercially available devices. The sheet shaped through the extrusion was stretched in a machine direction using a machine direction stretching machine which has a plurality of rolls, and was then fed into a tenter-type transverse direction stretching machine to conduct the transverse direction stretching. The machine direction stretching and the transverse direction stretching were implemented so that stretching conditions, such as a stretching ratio, a stretching temperature; the number of stretching rolls, a stretching speed, use of a pinch roll during the stretching, and surface roughness of the stretching roll, could be changed. The stretching temperature was set within a temperature range where 30-80 wt % of a crystalline portion of polyethylene in the sheet was melted based on the analysis results of the DSC.

The machine direction stretching machine comprised three preheating rolls, and three cooling and heat setting rolls before and after the stretching roll, respectively, and pinch rolls were used in the first preheating roll and the last heat setting roll.

The speed of the machine direction stretching was changed while the speed of the preheating roll located right before the first stretching roll was set at 1 m/min.

Thicknesses of the sheet before/after machine direction stretching were measured using a typical thickness measuring device. Before the machine direction stretching was conducted, the thickness of the sheet was set at 900 μm as described above and; after the machine direction stretching was conducted, the thickness of the sheet coincided with a value that was calculated by dividing the thickness before the stretching by the stretching ratio when the stretching was desirably achieved.

Slippage during the machine direction stretching was evaluated in such a way that, after a straight line was drawn using a pen on the sheet to be supplied into the stretching roll and on the surface of the roll coming into contact therewith, it was observed whether the straight line was broken depending on the difference between the speeds of the roll and the sheet when the sheet and the roll were moved and rotated, respectively.

To evaluate width uniformity of the sheet after the machine direction stretching, whether both edges of the sheet were parallel to each other was observed after the stretching. If the machine direction stretching is nonuniformly conducted, the width of the sheet is nonuniform, thus the edges of the sheet are meandrous. Although the sheet having nonuniform width is supplied into a transverse direction stretching tenter, chucks cannot desirably hold the edges of the sheet to stretch the sheet, thus it is impossible to conduct stretching in the transverse direction.

Figure 2:
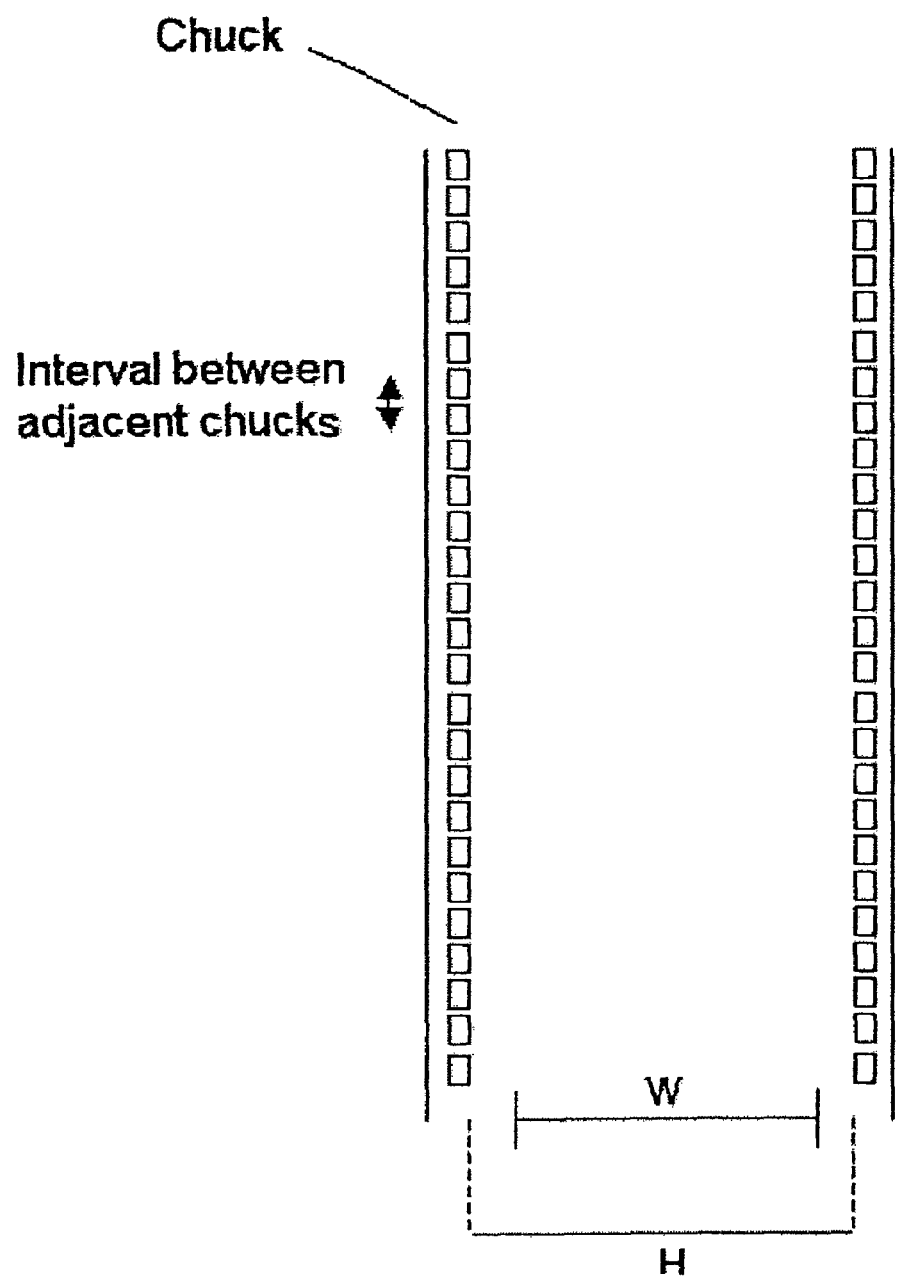
FIG. 2 illustrates a sheet which is two-step biaxially stretched according to the present invention.

In order to compare stretching ratio uniformities in two-step biaxial stretching and in simultaneous biaxial stretching to each other and to compare defective fractions after the stretching processes, distances between the chucks (H in FIGS. 1 and 2) before and after the stretching processes were measured using a typical ruler to calculate the stretching ratios, and the minimum width (L in FIG. 1) of the sheet after the stretching, which was relevant only to the simultaneous biaxial stretching process, was measured. After the stretching processes, 30 mm portions of both edges of the sheet, on which chuck marks remained and which were unstretched, were cut. After the stretching processes, the defective fractions were calculated using the maximum width between the chucks and the effective width after cutting edge portions of the sheet (a difference between H and W was expressed as a percentage of H in FIGS. 1 and 2).

Extraction of the diluent was carried out employing methylene chloride for 6 min through an immersion method using a continuous process, and afterwards, the film, from which the diluent was extracted, was dried with air. The dried film was set in a frame and then left in a convection oven at 120°

C. (the temperature where 20 wt % of the crystalline portion of polyethylene was melted) for 90 sec, thereby completing a heat-setting process.

Puncture strength, gas permeability, and the like, which were considered the most important physical properties of the microporous film, were measured, and the results are described in the following Tables 1 to 5.

Measurement of the physical properties (1) The puncture strength was measured by measuring the strength of the film when the film was punctured by a pin having a diameter of 0.5 mm moving at a speed of 120 mm/min.

(2) Tensile strength was measured according to ASTM D882.

(3) Shrinkage was gained by measuring average shrinkage in both machine and transverse directions after the film was left at 105° C.for 10 min, and expressed as a percentage.

(4) The gas permeability was measured using a porometer (CFP-1500-AEL manufactured by PMI Co. Ltd.). Conventionally, the gas permeability was expressed by a Gurley number, but since the effect of thickness of the film was not reflected by the Gurley number, it was difficult to obtain a relative permeability of a pore structure of the film. To avoid the above disadvantage, in the present invention, a Darcy's permeability constant was used. The Darcy's permeability constant was calculated by the following Equation 1, and nitrogen was used as gas in the present invention.

$$C = (8FTV)/(\pi D^2(P^2-1))$$ Equation 1 where, C is the Darcy's permeability constant, F is a flow rate, T is a sample thickness, V is a viscosity of the gas (0.185 for $N_2$), D is a sample diameter, and P is pressure.

An average value of Darcy's permeability constants in a range of 100-200 psi was used in the present invention.

Example 1

High density polyethylene having a weight average molecular weight of $2.2 \times 10^5$ was used as component I. A paraffin oil having a kinetic viscosity of 110 at 40° C.was used as component II. Contents of components I and II were 30 wt % and 70 wt %, respectively.

Stretching was conducted in machine and transverse directions at 118 and 119° C.which corresponded to temperatures at which 50 wt % of a crystalline portion of polyethylene was melted so that machine and transverse direction stretching ratios were 6.1 times and 6 times, respectively. The number of stretching rolls which were used to conduct the stretching in the machine direction was 5. Stretching speed ratios (speed ratio between the adjacent rolls in the front and the rear) of the stretching rolls were set at 1.2-1.5-1.5-1.5-1.5 times. In this case, the speeds of the rolls were increased to be approximately 1.2-1.8-2.7-4.1-6.1 m/min. Surfaces of the stretching rolls were all coated with chromium so as to have roughness of 0.6 s.

Example 2

High density polyethylene having a weight average molecular weight of $4.7 \times 10^5$ was used as component I. The remaining conditions were the same as those of example 1.

Example 3

High density polyethylene having a weight average molecular weight of $3.5 \times 10^5$ was used as component I. Contents of components I and II were 10 wt % and 90 wt %, respectively. The remaining conditions were the same as those of example 1.

Example 4

High density polyethylene having a weight average molecular weight of $3.5 \times 10^5$ was used as component I. Contents of components I and II were 50 wt % and 50 wt %, respectively. The remaining conditions were the same as those of example 1.

Example 5

High density polyethylene having a weight average molecular weight of $3.5 \times 10^5$ was used as component I, and a paraffin oil having a kinetic viscosity of 20 at 40° C.was used as component II. 50 parts by weight of calcium carbonate powder (components III) having an average particle size of 1 µm was added based on 100 parts by weight of a polyethylene composition of component I and component II. The remaining conditions were the same as those of example 1.

Example 6

High density polyethylene having a weight average molecular weight of $3.5 \times 10^5$ was used as component I, and paraffin oil having a kinetic viscosity of 200 at 40° C.was used as component II. The remaining conditions were the same as those of example 1.

Example 7

High density polyethylene having a weight average molecular weight of $3.5 \times 10^5$ was used as component I. Stretching was conducted in machine and transverse directions at 115 and 117° C which corresponded to temperatures at which 30 wt % of a crystalline portion of polyethylene was melted so that machine and transverse direction stretching ratios were 6.1 times and 6 times, respectively. The remaining conditions were the same as those of example 1.

Example 8

High density polyethylene having a weight average molecular weight of $3.5 \times 10^5$ was used as component I. Stretching was conducted in machine and transverse directions at 123° C.which corresponded to a temperature at which 80 wt % of a crystalline portion of polyethylene was melted so that machine and transverse direction stretching ratios were 6.1 times and 6 times, respectively. The remaining conditions were the same as those of example 1.

Example 9

High density polyethylene having a weight average molecular weight of $3.5 \times 10^5$ was used as component I. The number of stretching rolls which were used to conduct the stretching in the machine direction was set at 3, and stretching speed ratios of the stretching rolls were set at 1.2-2-2.5 times, thereby dispersing the total stretching ratio among the stretching rolls to conduct the stretching in a stepwise manner. The remaining conditions were the same as those of example 1.

Example 10

High density polyethylene having a weight average molecular weight of $3.5 \times 10^5$ was used as component I. The number of stretching rolls which were used to conduct the stretching in the machine direction was set at 10, and stretching speed ratios of the stretching rolls were set at 1.02-1.02-1.3-1.3-1.3-1.3-1.3-1.3-1.1-1.1 times, thereby dispersing the stretching. The remaining conditions were the same as those of example 1.

Example 11

High density polyethylene having a weight average molecular weight of $3.5 \times 10^5$ was used as component I. Stepwise stretching was conducted in a machine direction using stretching rolls having a surface treated so as to have roughness of 0.2 s. The remaining conditions were the same as those of example 1.

Example 12

High density polyethylene having a weight average molecular weight of $3.5 \times 10^5$ was used as component I. Stepwise stretching was conducted in a machine direction using stretching rolls having a surface treated so as to have roughness of 10 s. The remaining conditions were the same as those of example 1.

Example 13

High density polyethylene having a weight average molecular weight of $3.5 \times 10^5$ was used as component I. The remaining conditions were the same as those of example 1.

Example 14

High density polyethylene having a weight average molecular weight of $3.5 \times 10^5$ was used as component I. Machine and transverse direction stretching ratios were both set at 7 times. The remaining conditions were the same as those of example 1.

Example 15

High density polyethylene having a weight average molecular weight of $3.5 \times 10^5$ was used as component I. Machine and transverse direction stretching ratios were set at 8 and 4 times, respectively. The remaining conditions were the same as those of example 1.

Example 16

High density polyethylene having a weight average molecular weight of $3.5 \times 10^5$ was used as component I. Stretching was conducted in a machine direction at 115° C, which corresponds to a temperature at which 30 wt % of a crystalline portion of polyethylene is melted, and stretching was conducted in a transverse direction at 125° C, which corresponds to a temperature at which 80 wt % of a crystalline portion of polyethylene is melted. The remaining conditions were the same as those of example 1.

Example 17

High density polyethylene having a weight average molecular weight of $3.5 \times 10^5$ was used as component I. Stretching was conducted in a machine direction at 123° C, which corresponds to a temperature at which 80 wt % of a crystalline portion of polyethylene is melted, and stretching was conducted in a transverse direction at 116° C, which corresponds to a temperature at which 30 wt % of a crystalline portion of polyethylene is melted. The remaining conditions were the same as those of example 1.

Comparative Example 1

A composition which was required to form a sheet was the same as that in example 13, and stretching was conducted in a simultaneous biaxial stretching pilot plant. In consideration of commercial availability, a continuous process was employed. Stretching was conducted at 118° C, which corresponds to a temperature at which 50 wt % of a crystalline portion of polyethylene is melted, so that a stretching ratio was 36 times (machine direction ×transverse direction=6×6). After the stretching, the remaining processes were conducted through a procedure that was the same as the examples.

Comparative Example 2

High density polyethylene having a weight average molecular weight of $1.9 \times 10^5$ was used as component I. The remaining conditions were the same as those of example 1.

Comparative Example 3

High density polyethylene having a weight average molecular weight of $5.1 \times 10^5$ was used as component I. The remaining conditions were the same as those of example 1.

Comparative Example 4

High density polyethylene having a weight average molecular weight of $3.5 \times 10^5$ was used as component I. Contents of the components I and II were 7 wt % and 93 wt %, respectively. The remaining conditions were the same as those of example 1.

Comparative Example 5

High density polyethylene having a weight average molecular weight of $3.5 \times 10^5$ was used as component I. Contents of the components I and II were 55 wt % and 45 wt %, respectively. 50 parts by weight of calcium carbonate powder having an average particle size of 1 μm was used as component III based on 100 parts by weight of a polyethylene composition of component I and the component II. The remaining conditions were the same as those of example 1.

Comparative Example 6

High density polyethylene having a weight average molecular weight of $3.5 \times 10^5$ was used as component I. A paraffin oil having a kinetic viscosity of 10 at 40° C. was used as component II. The remaining conditions were the same as those of example 1.

Comparative Example 7

High density polyethylene having a weight average molecular weight of $3.5 \times 10^5$ was used as component I, and a paraffin oil having a kinetic viscosity of 250 at 40° C. was used as component II. The remaining conditions were the same as those of example 1.

Comparative Example 8

High density polyethylene having a weight average molecular weight of $3.5 \times 10^5$ was used as component I.

Stretching was conducted in a machine direction at 112° C, which corresponds to a temperature at which 10 wt % of a crystalline portion of polyethylene is melted so that a machine direction stretching ratio was 6.1 times. The remaining conditions were the same as those of example 1.

Comparative Example 9

High density polyethylene having a weight average molecular weight of $3.5 \times 10^5$ was used as component I. Stretching was conducted in machine and transverse directions at 126 and 127° C, which corresponds to temperatures at which 90 wt % of a crystalline portion of polyethylene is melted. The remaining conditions were the same as those of example 1.

Comparative Example 10

High density polyethylene having a weight average molecular weight of $3.5 \times 10^5$ was used as component I. The number of stretching rolls which were used to conduct stretching in the machine direction was set at 2, and stretching speed ratios of the stretching rolls were set at 1.54 times, thereby dispersing the total stretching ratio among the stretching rolls to conduct the stretching in a stepwise manner. The remaining conditions were the same as those of example 1.

Comparative Example 11

High density polyethylene having a weight average molecular weight of $3.5 \times 10^5$ was used as component I. The number of stretching rolls which were used to conduct the stretching in the machine direction was set at 5, and stretching speed ratios of the stretching rolls were set at 1.01-5.46-1.03-1.03-1.03 times, thereby dispersing the total stretching ratio among the stretching rolls to conduct the stretching in a stepwise manner. The machine direction stretching ratio was set at 6 times. The remaining conditions were the same as those of example 1.

Comparative Example 12

High density polyethylene having a weight average molecular weight of $3.5 \times 10^5$ was used as component I. The number of stretching rolls which were used to conduct the stretching in the machine direction was set at 5, and stretching speed ratios of the stretching rolls were set at 1.2-1.5-1.5-1.5-1.5 times, thereby dispersing the total stretching ratio among the stretching rolls to conduct the stretching in a stepwise manner. A pinch roll was used in the first stretching roll operated at the stretching ratio of 1.2 times so as to press a sheet to prevent the sheet from slipping therefrom. The remaining conditions were the same as those of example 1.

Comparative Example 13

High density polyethylene having a weight average molecular weight of $3.5 \times 10^5$ was used as component I. Stretching was conducted stepwise in a machine direction using stretching rolls having a surface treated so as to have roughness of 0.1 s. The remaining conditions were the same as those of example 1.

Comparative Example 14

High density polyethylene having a weight average molecular weight of $3.5 \times 10^5$ was used as component I. Stretching was conducted stepwise in a machine direction using stretching rolls having a surface treated so as to have roughness of 12 s. The remaining conditions were the same as those of example 1.

TABLE 1

| Item | | Unit | Ex. 1 | Ex. 2 | Ex. 3 | Ex. 4 | Ex. 5 | Ex. 6 |
|---|---|---|---|---|---|---|---|---|
| High density polyethylene (component I) | Mw | g/mol | $2.2\,10^5$ | $4.7\,10^5$ | $3.5\,10^5$ | $3.5\,10^5$ | $3.5\,10^5$ | $3.5\,10^5$ |
| | Content | wt % | 30 | 30 | 10 | 50 | 30 | 30 |
| Paraffin oil (component II) | 40° C. viscosity | cSt | 110 | 110 | 110 | 110 | 20 | 200 |
| | Content | wt % | 70 | 70 | 90 | 50 | 70 | 70 |
| Calcium carbonate (component III) | Content | pbw* | — | — | — | — | 50 | — |
| Number of gels (10 kg/hr) | | #/100 cm² | 9 | 14 | 10 | 12 | 14 | 9 |
| Surface of sheet (10 kg/hr) | | — | Good | Good | Good | Good | Good | Good |
| Machine direction stretching conditions | Temperature | ° C. | 118 | 118 | 115 | 121 | 117 | 118 |
| | Melting of crystalline portion | % | 50 | 50 | 50 | 50 | 50 | 50 |
| | No. of stretching rolls | No. | 5 | 5 | 5 | 5 | 5 | 5 |
| | Pinch roll used | No. | — | — | — | — | — | — |
| | Roughness of roll | S | 0.6 | 0.6 | 0.6 | 0.6 | 0.6 | 0.6 |
| | Stretching ratio | Times | 6.1 | 6.1 | 6.1 | 6.1 | 6.1 | 6.1 |
| | Stretching speed ratio of each stretching roll | Times | 1.2-1.5-1.5-1.5-1.5 | 1.2-1.5-1.5-1.5-1.5 | 1.2-1.5-1.5-1.5-1.5 | 1.2-1.5-1.5-1.5-1.5 | 1.2-1.5-1.5-1.5-1.5 | 1.2-1.5-1.5-1.5-1.5 |
| Thickness before/after machine direction stretching | | μm | 900/150 | 900/147 | 900/152 | 900/147 | 900/149 | 900/147 |
| Slippage during machine direction stretching | | — | None | None | None | None | None | None |

TABLE 1-continued

| Item | | Unit | Ex. 1 | Ex. 2 | Ex. 3 | Ex. 4 | Ex. 5 | Ex. 6 |
|---|---|---|---|---|---|---|---|---|
| Width uniformity after machine direction stretching | | — | Good | Good | Good | Good | Good | Good |
| Transverse direction stretching conditions | Temperature | °C. | 119 | 119 | 116 | 122 | 118 | 119 |
| | Melting of crystalline portion | % | 50 | 50 | 50 | 50 | 50 | 50 |
| | Stretching ratio | Times | 6 | 6 | 6 | 6 | 6 | 6 |
| Puncture strength | | N/μm | 0.21 | 0.28 | 0.21 | 0.28 | 0.22 | 0.25 |
| Gas permeability | | $10^{-5}$ Darcy | 1.8 | 1.7 | 2.1 | 1.6 | 3 | 1.7 |

*parts by weight based on 100 parts by weight of polyethylene composition of the components I and II

TABLE 2

| Item | | Unit | Ex. 7 | Ex. 8 | Ex. 9 | Ex. 10 | Ex. 11 | Ex. 12 |
|---|---|---|---|---|---|---|---|---|
| High density polyethylene (component I) | Mw | g/mol | $3.5\ 10^5$ | $3.5\ 10^5$ | $3.5\ 10^5$ | $3.5\ 10^5$ | $3.5\ 10^5$ | $3.5\ 10^5$ |
| | Content | wt % | 30 | 30 | 30 | 30 | 30 | 30 |
| Paraffin oil (component II) | 40° C. viscosity | cSt | 110 | 110 | 110 | 110 | 110 | 110 |
| | Content | wt % | 70 | 70 | 70 | 70 | 70 | 70 |
| Number of gels(10 kg/hr) | | #/100 cm² | 11 | 10 | 12 | 11 | 10 | 10 |
| Surface of sheet(10 kg/hr) | | — | Good | Good | Good | Good | Good | Good |
| Machine direction stretching conditions | Temperature | °C. | 115 | 123 | 118 | 118 | 118 | 118 |
| | Melting of crystalline portion | % | 30 | 80 | 50 | 50 | 50 | 50 |
| | No. of stretching rolls | No. | 5 | 5 | 3 | 10 | 5 | 5 |
| | Pinch roll used | No. | — | — | — | — | — | — |
| | Roughness of roll | S | 0.6 | 0.6 | 0.6 | 0.6 | 0.2 | 10 |
| | Stretching ratio | Times | 6.1 | 6.1 | 6 | 6.1 | 6.1 | 6.1 |
| | Stretching speed ratio of each stretching roll | Times | 1.2-1.5-1.5-1.5-1.5 | 1.2-1.5-1.5-1.5-1.5 | 1.2-2-2.5 | 1.02 * 2-1.3 * 6-1.1 * 2 | 1.2-1.5-1.5-1.5-1.5 | 1.2-1.5-1.5-1.5-1.5 |
| Thickness before/after machine direction stretching | | μm | 900/150 | 900/150 | 900/150 | 900/150 | 900/147 | 900/152 |
| Slippage during machine direction stretching | | — | None | None | None | None | None | None |
| Width uniformity after machine direction stretching | | — | Good | Good | Good | Good | Good | Good |
| Transverse direction stretching conditions | Temperature | °C. | 117 | 123 | 119 | 119 | 119 | 119 |
| | Melting of crystalline portion | % | 30 | 80 | 50 | 50 | 50 | 50 |
| | Stretching ratio | Times | 6 | 6 | 6 | 6 | 6 | 6 |
| Puncture strength | | N/μm | 0.26 | 0.21 | 0.24 | 0.25 | 0.25 | 0.23 |
| Gas permeability | | $10^{-5}$ Darcy | 1.4 | 2.1 | 1.7 | 1.8 | 1.6 | 1.9 |

TABLE 3

| Item | | Unit | Ex. 13 | Ex. 14 | Ex. 15 | Ex. 16 | Ex. 17 | Co. Ex. 1 |
|---|---|---|---|---|---|---|---|---|
| High density polyethylene (component I) | Mw | g/mol | $3.5\ 10^5$ | $3.5\ 10^5$ | $3.5\ 10^5$ | $3.5\ 10^5$ | $3.5\ 10^5$ | $3.5\ 10^5$ |
| | Content | wt % | 30 | 30 | 30 | 30 | 30 | 30 |
| Paraffin oil (component II) | 40° C. viscosity | cSt | 110 | 110 | 110 | 110 | 110 | 110 |
| | Content | wt % | 70 | 70 | 70 | 70 | 70 | 70 |
| *Total stretching conditions | Temperature | °C. | 118/119 | 118/119 | 118/119 | 115/125 | 123/116 | 118 |
| | Melting of crystalline portion | % | 50/50 | 50/50 | 50/50 | 30/80 | 80/30 | 50 |
| | Stretching ratio | Times | 6.1/6 | 7/7 | 8/4 | 6.1/6 | 6.1/6 | 6 |
| Machine direction length of chuck | | mm | 40 | 40 | 40 | 40 | 40 | 25 |
| Machine direction length between centers of chucks after stretching | | mm | 50 | 50 | 50 | 50 | 50 | 150 |
| Machine direction holding index of chuck | | % | 80 | 80 | 80 | 80 | 80 | 17 |
| Sheet width between chucks before stretching | | mm | 220 | 220 | 220 | 220 | 220 | 220 |

TABLE 3-continued

| Item | Unit | Ex. 13 | Ex. 14 | Ex. 15 | Ex. 16 | Ex. 17 | Co. Ex. 1 |
|---|---|---|---|---|---|---|---|
| Maximum width between chucks after stretching | mm | 1320 | 1540 | 880 | 1320 | 1320 | 1320 |
| Actual maximum stretching ratio in transverse direction | Times | 6 | 7 | 4 | 6 | 6 | 6 |
| Minimum width after stretching | mm | 1320 | 1540 | 880 | 1320 | 1320 | 1180 |
| Actual minimum stretching ratio in transverse direction | Times | 6 | 7 | 4 | 6 | 6 | 5.1 |
| Remaining width gained by cutting both edges after stretching | mm | 1260 | 1480 | 820 | 1260 | 1260 | 1120 |
| Defective fractions after stretching | % | 4.5 | 3.9 | 6.8 | 4.5 | 4.5 | 15.2 |
| Puncture strength | N/μm | 0.25 | 0.31 | 0.24 | 0.25 | 0.24 | 0.23 |
| Tensile strength MD | Kg/cm$^2$ | 1400 | 1630 | 1810 | 1500 | 1320 | 1380 |
| TD | Kg/cm$^2$ | 1350 | 1530 | 850 | 1150 | 1390 | 1150 |
| Shrinkage | % | 3.5 | 4.5 | 2.5 | 3.1 | 3.7 | 3 |
| Gas permeability | 10$^{-5}$ Darcy | 1.7 | 1.8 | 1.9 | 2.2 | 2.5 | 1.8 |

*Total stretching conditions: conditions with respect to machine direction/transverse direction are described together in Table 3

TABLE 4

| Item | | Unit | Co. Ex. 2 | Co. Ex. 3 | Co. Ex. 4 | Co. Ex. 5 | Co. Ex. 6 | Co. Ex. 7 |
|---|---|---|---|---|---|---|---|---|
| High density polyethylene (component I) | Mw | g/mol | 1.9 10$^5$ | 5.1 10$^5$ | 3.5 10$^5$ | 3.5 10$^5$ | 3.5 10$^5$ | 3.5 10$^5$ |
| | Content | wt % | 30 | 30 | 7 | 55 | 30 | 30 |
| Paraffin oil (component II) | 40° C. viscosity | cSt | 110 | 110 | 110 | 110 | 10 | 250 |
| | Content | wt % | 70 | 70 | 93 | 45 | 70 | 70 |
| Calcium carbonate (component III) | Content | Parts by weight | — | — | — | 50 | — | — |
| Number of gels (10 kg/hr) | | #/100 cm$^2$ | 4 | 55 | 3 | 60 | 80 | 90 |
| Surface of sheet (10 kg/hr) | | — | Good | Poor | Good | Poor | Poor | Poor |
| Machine direction stretching conditions | Temperature | ° C. | 118 | 118 | 114 | 121 | 117 | 118 |
| | Melting of crystalline portion | % | 50 | 50 | 50 | 50 | 50 | 50 |
| | No. of stretching rolls | No. | 5 | 5 | 5 | 5 | 5 | 5 |
| | Pinch roll used | No. | — | — | — | — | — | — |
| | Roughness of roll | S | 0.6 | 0.6 | 0.6 | 0.6 | 0.6 | 0.6 |
| | Stretching ratio | Times | 6.1 | 6.1 | 6.1 | 6.1 | 6.1 | 6.1 |
| | Stretching speed ratio for each stretching roll | Times | 1.2-1.5-1.5-1.5-1.5 | 1.2-1.5-1.5-1.5-1.5 | 1.2-1.5-1.5-1.5-1.5 | 1.2-1.5-1.5-1.5-1.5 | 1.2-1.5-1.5-1.5-1.5 | 1.2-1.5-1.5-1.5-1.5 |
| Thickness before/after machine direction stretching | | μm | 900/140 | 900/155 | 900/135 | Non-uniform | 900/149 | 900/147 |
| Slippage during machine direction stretching | | — | None | None | None | Slip | None | None |
| Width uniformity after machine direction stretching | | — | Good | Good | Good | Poor | Poor | Poor |
| Transverse direction stretching conditions | Temperature | ° C. | 119 | 119 | 115 | Transverse direction stretching Impossible | 118 | 119 |
| | Melting of crystalline portion | % | 50 | 50 | 50 | | 50 | 50 |
| | Stretching ratio | Times | 6 | 6 | 6 | — | 6 | 6 |

TABLE 4-continued

| Item | Unit | Co. Ex. 2 | Co. Ex. 3 | Co. Ex. 4 | Co. Ex. 5 | Co. Ex. 6 | Co. Ex. 7 |
|---|---|---|---|---|---|---|---|
| Puncture strength | N/μm | 0.18 | 0.29 | 0.19 | — | 0.22 | 0.25 |
| Gas permeability | $10^{-5}$ Darcy | 1.8 | 1.7 | 0.8 | — | 1.9 | 1.7 |

TABLE 5

| Item | | Unit | Co. Ex. 8 | Co. Ex. 9 | Co. Ex. 10 | Co. Ex. 11 | Co. Ex. 12 | Co. Ex. 13 | Co. Ex. 14 |
|---|---|---|---|---|---|---|---|---|---|
| High density polyethylene (component I) | Mw | g/mol | $3.5\,10^5$ | $3.5\,10^5$ | $3.5\,10^5$ | $3.5\,10^5$ | $3.5\,10^5$ | $3.5\,10^5$ | $3.5\,10^5$ |
| | Content | wt % | 30 | 30 | 30 | 30 | 30 | 30 | 30 |
| Paraffin oil (component II) | 40° C. viscosity | cSt | 110 | 110 | 110 | 110 | 110 | 110 | 110 |
| | Content | wt % | 70 | 70 | 70 | 70 | 70 | 70 | 70 |
| Number of gels (10 kg/hr) | | #/100 cm² | 10 | 11 | 12 | 12 | 14 | 10 | 11 |
| Surface of sheet (10 kg/hr) | | — | Good | Good | Good | Good | Good | Good | Good |
| Machine direction stretching conditions | Temperature | ° C. | 112 | 126 | 118 | 118 | 118 | 118 | 118 |
| | Melting of crystalline portion | % | 10 | 90 | 50 | 50 | 50 | 50 | 50 |
| | No. of stretching rolls | No. | 5 | 5 | 2 | 5 | 5 | 5 | 5 |
| | Pinch roll used | No. | — | — | — | — | 1 | — | — |
| | Roughness of roll | S | 0.6 | 0.6 | 0.6 | 0.6 | 0.6 | 0.1 | 12 |
| | Stretching ratio | Times | 6.1 | 6.1 | 6 | 6 | 6.1 | 6.1 | 6.1 |
| | Stretching speed ratio for each stretching roll | Times | 1.2-1.5-1.5-1.5-1.5 | 1.2-1.5-1.5-1.5-1.5 | 1.5-4 | 1.01-5.46-1.03-1.03-1.03 | 1.2-1.5-1.5-1.5-1.5 | 1.2-1.5-1.5-1.5-1.5 | 1.2-1.5-1.5-1.5-1.5 |
| Thickness before/after machine direction stretching | | μm | Non-uniform | 900/135 | Non-uniform | 900/190 | 900/110 | Non-uniform | 900/152 |
| Slippage during machine direction stretching | | — | Slip | None | Slip | Slip | None | Slip | None |
| Width uniformity after machine direction stretching | | — | Non-uniform | Good | Non-uniform | Non-uniform | Good | Non-uniform | Good |
| Transverse direction stretching conditions | Temperature | ° C. | Transverse direction stretching Impossible | 126 | Transverse direction stretching Impossible | Transverse direction stretching Impossible | 119 | Transverse direction stretching Impossible | 119 |
| | Melting of crystalline portion | % | | 90 | | | 50 | | 50 |
| | Stretching ratio | Times | — | 6 | — | — | 6 | — | 6 |
| Puncture strength | | N/μm | — | 0.17 | — | — | 0.29 | — | 0.18 |
| Gas permeability | | $10^{-5}$ Darcy | — | 0.7 | — | — | 0.5 | — | 0.9 |

As described above, in the present invention, since a two-step biaxial stretching process in which stretching is conducted in a machine direction so that the stretching is dispersed among rolls is employed, it is possible to produce a microporous polyethylene film which has high productivity, consistent quality, high puncture strength, high gas permeability, and low shrinkage, thus assuring excellent electric stability. Therefore, the microporous polyethylene film according to the present invention can be usefully applied to battery separators and various filters. Furthermore, in the present invention, since the stretching can be conducted at variable stretching ratios, it is possible to produce the microporous polyethylene film having various physical properties.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of producing a microporous polyethylene film, comprising:
   (a) melt-extruding a resin composition to form a sheet, the resin composition comprising:
      100 parts by weight of a polyethylene composition including 10-50 wt % polyethylene having a weight average molecular weight of from $2 \times 10^5$ to less than $5 \times 10^5$ (component I) and 90-50 wt % diluent having a kinetic viscosity of 20-200 cSt at 40° C. (component II); and 0-150 parts by weight of inorganic powder (component III);

(b) stretching the sheet according to a roll-type stretching manner in a machine direction at a stretching ratio of from 3 times to 10 times without using a pinch roll, and then subsequently stretching the stretched sheet according to a tenter-type stretching manner in a transverse direction at a stretching ratio of from 2 times to 10 times to produce a film, both of the roll type stretching and the subsequent tenter type stretching being performed at the temperature that 30-80 wt % of the crystalline portion of the polyethylene is melted; and (c) extracting the diluent from the film, and heat-setting the resulting film, wherein, stretching part of a roll stretching machine used in the roll-type stretching has at least 3 stretching rolls, speed of each of stretching rolls is 1.02 times ~ a predetermined value times faster than speed of the immediately preceding roll, and the predetermined value is gained by multiplying a total machine direction stretching ratio by 0.9 and the roll of the stretching part has a surface roughness of 0.2-10 s.

2. The method as set forth in claim 1, wherein the weight average molecular weight of polyethylene is $3 \times 10^5$-$4 \times 10^5$.

3. The method as set forth in claim 1, wherein the diluent is aliphatic hydrocarbon, cyclic hydrocarbon, phthalic acid ester, fatty acid having 10-20 carbons, fatty alcohol having 10-20 carbons, or a mixture thereof.

4. The method as set forth in claim 3, wherein the diluent is nonane, decane, decalin, paraffin oil, paraffin wax, dibutyl phthalate, dihexyl phthalate, dioctyl phthalate, palmitic acid, stearic acid, oleic acid, linoleic acid, linolenic acid, palmitic alcohol, stearic alcohol, oleic alcohol, or a mixture thereof.

5. The method as set forth in claim 4, wherein the diluent is the paraffin oil having a kinetic viscosity of 20-200 cSt at 40° C.

6. The method as set forth in claim 1, wherein content of polyethylene (component I) is 20-40 wt %, and content of the diluent (component II) is 80-60 wt %.

7. The method as set forth in claim 1, wherein the inorganic powder (component III) is selected from the group consisting of calcium carbonate, silica, barium sulfate, talc, and a mixture thereof.

8. The method as set forth in claim 1, wherein content of the inorganic powder (component III) is 10-100 parts by weight based on 100 parts by weight of the polyethylene composition including polyethylene (component I) and the diluent (component II).

9. The method as set forth in claim 1, wherein an extrusion temperature is 160-250° C. in the step (a).

10. The method as set forth in claim 1, wherein the sheet is stretched in a machine direction at a stretching ratio of from 3 times to 10 times, and the sheet is stretched in a transverse direction at a stretching ratio of from 2 times to 10 times.

11. The method as set forth in claim 10, wherein the sheet is stretched in a machine direction at a stretching ratio of from 4 times to 8 times, and the sheet is stretched in a transverse direction at a stretching ratio of from 3 times to 9 times.

12. The method as set forth in claim 1, wherein the number of the stretching rolls is 4-20.

13. The method as set forth in claim 1, wherein surface roughness of each of the stretching rolls is 0.2-10 s.

14. The method as set forth in claim 13, wherein the surface roughness of each of the stretching rolls is 0.3-6 s.

15. The method as set forth in claim 1, wherein stretching temperatures in the machine and transverse directions are selected at a temperature range, where 40-70 wt % of the crystalline portion of polyethylene is melted.

* * * * *